United States Patent
Moghadas et al.

(10) Patent No.: US 9,407,134 B2
(45) Date of Patent: Aug. 2, 2016

(54) SYSTEMS AND METHODS FOR LIMITING CURRENT INRUSH IN ELECTRIC DRIVE SYSTEMS

(71) Applicant: Baker Hughes Incorporated, Houston, TX (US)

(72) Inventors: Amin A. Moghadas, Broken Arrow, OK (US); John M. Leuthen, Claremore, OK (US); Renato L. Pichilingue, Houston, TX (US); Patrick B. Cochran, Owasso, OK (US)

(73) Assignee: Baker Hughes Incorporated, Houston, TX (US)

( * ) Notice: Subject to any disclaimer, the term of this patent is extended or adjusted under 35 U.S.C. 154(b) by 91 days.

(21) Appl. No.: 14/247,442

(22) Filed: Apr. 8, 2014

(65) Prior Publication Data
US 2015/0162864 A1 Jun. 11, 2015

Related U.S. Application Data

(60) Provisional application No. 61/914,797, filed on Dec. 11, 2013.

(51) Int. Cl.
| | |
|---|---|
| *H02P 1/00* | (2006.01) |
| *H02P 1/28* | (2006.01) |
| *H02P 3/00* | (2006.01) |
| *H02P 7/06* | (2006.01) |
| *H02M 1/32* | (2007.01) |
| *H02M 1/36* | (2007.01) |
| *H02M 7/162* | (2006.01) |
| *H02M 7/219* | (2006.01) |
| *H02M 5/45* | (2006.01) |
| *H02M 5/458* | (2006.01) |
| *H02M 1/42* | (2007.01) |

(52) U.S. Cl.
CPC ......... *H02M 1/32* (2013.01); *H02M 1/36* (2013.01); *H02M 7/1626* (2013.01); *H02M 7/219* (2013.01); *H02M 5/4505* (2013.01); *H02M 5/4585* (2013.01); *H02M 2001/4291* (2013.01); *Y02B 70/126* (2013.01)

(58) Field of Classification Search
CPC ...................................................... H02P 31/00
USPC ........................................................ 318/504
See application file for complete search history.

(56) References Cited

U.S. PATENT DOCUMENTS

| | | | | |
|---|---|---|---|---|
| 5,234,319 | A * | 8/1993 | Wilder | 417/40 |
| 6,264,431 | B1 * | 7/2001 | Triezenberg | 417/36 |
| 6,744,644 | B2 | 6/2004 | Kojori | |
| 7,049,786 | B1 * | 5/2006 | Toliyat et al. | 318/254.1 |
| 2007/0210583 | A1 * | 9/2007 | Stahlhut et al. | 290/52 |
| 2007/0210584 | A1 * | 9/2007 | Stahlhut et al. | 290/52 |

* cited by examiner

*Primary Examiner* — Erick Glass
(74) *Attorney, Agent, or Firm* — Law Offices of Mark L. Berrier (57) ABSTRACT

Systems and methods for controlling potentially damaging inrushes of current to the capacitor bank of an electric drive system when the voltage on the capacitor bank is low. In one embodiment, a variable speed drive has a converter that converts AC power to DC power, a capacitor bank that receives the DC power, and an inverter that converts the DC power stored by the capacitor bank to AC output power. The converter has three sections that rectify the phases of three-phase input power. Each section has at least one controlled rectifier component, and the rectifier components have switches connected to them in parallel. When the voltage on the capacitor bank is low, the controlled rectifiers and switches are controlled to prevent dangerously high inrushes of current to the capacitor bank.

17 Claims, 4 Drawing Sheets

SYSTEMS AND METHODS FOR LIMITING CURRENT INRUSH IN ELECTRIC DRIVE SYSTEMS

CROSS-REFERENCE TO RELATED APPLICATIONS

This application claims the benefit of commonly owned U.S. Provisional Patent Application 61/914,797, filed Dec. 11, 2013 by Moghadas, et al., which is incorporated by reference as if set forth herein in its entirety.

BACKGROUND

1. Field of the Invention

The invention relates generally to electrical control systems, and more particularly to systems and methods for controlling variable speed drives of the type used in connection with oil production equipment.

2. Related Art

Oil is typically produced by drilling a well into an oil reservoir and removing the oil from the reservoir through the well. If the pressure in the well is insufficient to force the oil out of the well, an artificial lift system such as an electric submersible pump (ESP) or an above-ground horizontal pump may be used to pump the oil out of the well. Electrical power is provided to an electrical drive system at the surface of the well and, in turn, this drive system provides the required electrical power to the pump.

Commonly, drive systems for downhole equipment such as an ESP receives power from a local source at the surface of the well and transforms the power to a different form that is suitable to drive the downhole equipment. A typical variable speed drive for an ESP has a converter section, a capacitor bank and an inverter section. The converter section converts power from a local AC power supply to DC power and supplies this power to the capacitor bank. The energy stored in the capacitor bank is then used by the inverter section to produce an AC or pulse width modulated (PWM) output voltage that has characteristics (e.g., voltage and frequency) that are specifically designed to drive the ESP at a desired speed.

The operation of these electric drive systems is occasionally interrupted. This may be the result of an interruption in the supply of power to the system, a need to perform repair or maintenance on the system, or various other reasons. When the system is restarted, the capacitor bank has typically discharged, either completely or partially, so the restart may cause a sudden inrush of current to the discharged capacitor bank. If this inrush of current is not controlled, it may damage the components of the drive system, such as fuses.

It would therefore be desirable to provide systems and methods for controlling the inrush of current to the capacitor bank of an electric drive system when the system is started or restarted.

SUMMARY OF THE INVENTION

This disclosure is directed to systems and methods for controlling the charge or recharge current provided to a capacitor bank in an electric drive system for electric equipment such as pump motors. In one particular embodiment, a variable speed drive has a converter, one or more capacitor banks, and an inverter. The converter has an upper junction which is electrically connected to a first input of the one or more capacitor banks and a lower junction which is electrically connected to a second input of the one or more capacitor banks. The converter includes first, second and third converter sections that are identically configured, except that each section receives a different phase of the three-phase AC input power. Each of the first, second and third converter sections includes a pair of rectifier components (e.g., diodes or silicon controlled rectifiers) that are electrically connected in series between the upper junction and the lower junction. At least one of the first and second rectifier components (and possibly each of these components) is a controlled rectifier. Each of the first and second rectifier components has a switch (e.g., an insulated gate bipolar transistor) that is electrically connected in parallel with the rectifier component. An inductor is electrically connected between the power source and an intermediate junction at which the pair of rectifier components are connected to each other. The drive includes a controller that is coupled to provide control signals to the controlled rectifiers and the switches. The controller determines when a voltage on at least one of the capacitor banks is low enough that uncontrolled rectification of the input power could result in dangerously high recharge currents, and provides control signals to the controlled rectifiers and the switches to selectively limit the recharge current provided by the converter to the capacitor bank. The controller may determine, for example, that limiting the recharge current is necessary in response to determining that the voltage on the at least one of the capacitor banks is less than a threshold voltage. Alternatively, the controller may determine that the variable speed drive is being powered on, and that the capacitor bank voltage is likely low enough that the recharge current should be limited.

One alternative embodiment comprises an artificial lift system that includes a pump (e.g., an electric submersible pump or horizontal above-ground pump) and a variable speed drive that is coupled to provide power to the pump. The variable speed drive includes a converter that converts received AC power to DC power, a capacitor bank that is charged by the converter, and an inverter that inverts DC power from the capacitor bank to produce an AC output waveform that drives the pump motor. The converter is connected to the capacitor bank at an upper junction and a lower junction. The converter includes three identically configured converter sections. Each section receives a different phase of the three-phase AC input power provided to the drive. Each of the converter sections has a pair of rectifier components (e.g., diodes or silicon controlled rectifiers) that are connected in series between the upper junction and the lower junction. One or more of the rectifier components of each converter section is a controlled rectifier. Each of the rectifier components has a switch (e.g., an insulated gate bipolar transistor) that is connected in parallel with the corresponding rectifier component. An inductor is electrically coupled between the power source and an intermediate junction at which the pair of rectifier components are connected to each other. The drive has a controller that provides control signals to the controlled rectifiers and the switches. The controller determines when a voltage on at least one of the capacitor banks is low enough that uncontrolled rectification of the input power could result in dangerously high recharge currents, and provides control signals to the controlled rectifiers and the switches to selectively limit the recharge current provided by the converter to the capacitor bank. The controller may determine, for example, that limiting the recharge current is necessary in response to determining that the voltage on the at least one of the capacitor banks is less than a threshold voltage, or that the variable speed drive is being powered on.

Another alternative embodiment comprises a method implemented in an electric drive system that produces an output waveform suitable for driving electric equipment such as an electric pump motor. The method may include providing a variable speed drive, determining when a voltage on a capacitor bank of the drive is sufficiently low that uncontrolled rectifier operation may produce dangerously high recharge currents, and providing control signals to the controlled rectifiers and switches in the drive to selectively limit the recharge current provided by the converter of the drive to the capacitor bank. The control signals that limit the recharge current may be generated in response to, for example, determining that the voltage on the capacitor bank is less than the threshold voltage, or determining that the variable speed drive is being powered on. The drive used in this method has a converter that includes one or more converter sections. Each converter section has first and second rectifier components that are connected in series between terminals of the capacitor bank, as well as an inductor that is connected between an intermediate junction between the first and second rectifier components and an input for a corresponding phase of a power source. At least one of the rectifier components in each converter section is a controlled rectifier, and each of the rectifier components has a switch coupled in parallel with it. A controller of the drive operates to produce control signals that are provided to the controlled rectifier and switches, thereby controlling these components to limit the recharge current which is provided to the capacitor bank.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for controlling the current that flows through a converter of a variable speed drive to recharge a capacitor bank of the drive, thereby reducing damage that could otherwise result from sudden inrushes of current upon starting or restarting the drive.

In one embodiment, an electric submersible pump motor is controlled using a variable speed drive The variable speed drive includes converter and inverter portions, as well as a capacitor bank and control systems. The drive receives AC input power and generates output power which is suitable for driving the pump. The drive is configured to determine when there is sufficient difference between the AC phase to phase input voltages and the internal DC capacitor bank voltage to present a risk of high input currents that could damage the drive's components. In this case, the converter is controlled to limit the current to the capacitor bank, thereby preventing potentially harmful inrushes of current.

In this embodiment, the drive's converter includes a set of rectifier components, at least a portion of which are controlled rectifiers (e.g., silicon controlled rectifiers, or SCRs). When the DC voltage on the capacitor bank is high enough that current inrush is not a concern, the controlled rectifiers are allowed to act as simple diodes. When the DC voltage on the capacitor bank is lower, input signals are provided to the controlled rectifiers so that they do not immediately turn on when the input voltage is higher than the capacitor bank voltage. The converter also includes, for each of the rectifier components, a switch connected in parallel to the rectifier component. The switches may be, for example, insulated gate bipolar transistors (IGBTs) or metal-oxide-semiconductor field effect transistors (MOSFETs). The switches can be turned on to allow current from the input to flow in the direction opposite that allowed by the corresponding rectifier components. The switches do not have built in freewheeling diodes.

Figure 1:
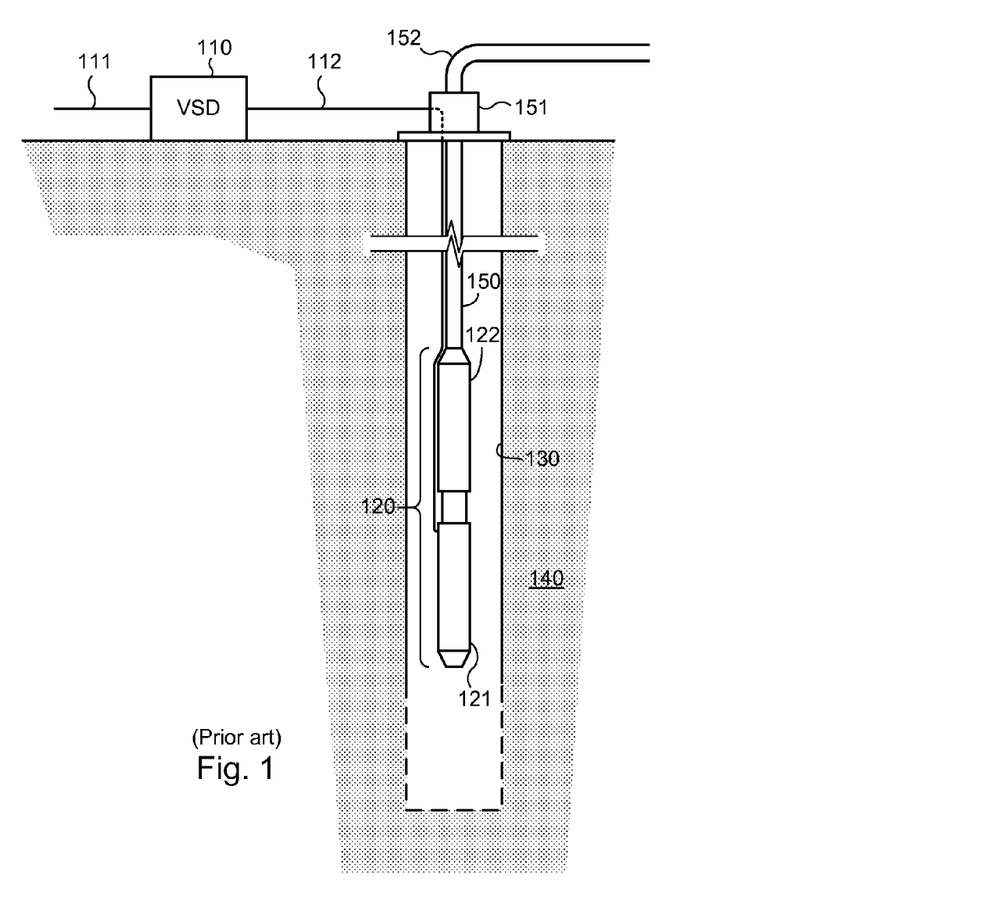
FIG. 1 is a diagram illustrating an electric submersible pump system in accordance with one exemplary embodiment.

Referring to FIG. 1, a diagram illustrating an electric submersible pump and control system in accordance with one exemplary embodiment is shown. In this embodiment, a variable speed drive 110 is coupled to an electric submersible pump 120. Pump 120 is positioned within a wellbore 130 which has been drilled into an oil-bearing geological structure 140. Wellbore 130 is cased and is perforated at the lower end of the well to allow oil to flow from the formation into the well.

Pump 120 is coupled to the end of tubing string 150. Pump 120 and tubing string 150 are lowered into the wellbore to position the pump in producing portion of the well (i.e., the perforated portion.) Pump 120 is then operated in order to pump oil from the producing portion of the well, through tubing string 150 to well head 151. The oil then flows out through production flow line 152 and into storage tanks (not shown in the figure.)

Pump 120 includes an electric motor section 121 and a pump section 122. (It should be noted that pump 120 may include various other components which will not be described in detail here because they are well known in the art and are not important to a discussion of the invention.) Motor section 121 is operated to drive pump section 122, which actually pumps the oil through the tubing string and out of the well. In this embodiment, motor section 121 is an AC (alternating current) induction motor which is driven by variable speed drive 110. Variable speed drive 110 receives AC input power from an external source such as a generator (not shown in the figure) via input line 111. Drive 110 rectifies the AC input power and then produces output power that is suitable to drive motor section 121 of pump 120. This output power is provided to motor section 121 via drive output line 112, which runs down the wellbore along tubing string 150.

It should be noted that, while FIG. 1 depicts an ESP system, the present disclosure is applicable to other types of systems as well. Drives that have features described and claimed herein may be utilized in connection with motors that drive above-ground pump systems as well as downhole systems, so references to drives used with any particular type of pump system should be construed broadly to be applicable to drives in other types of pump systems.

Figure 2:
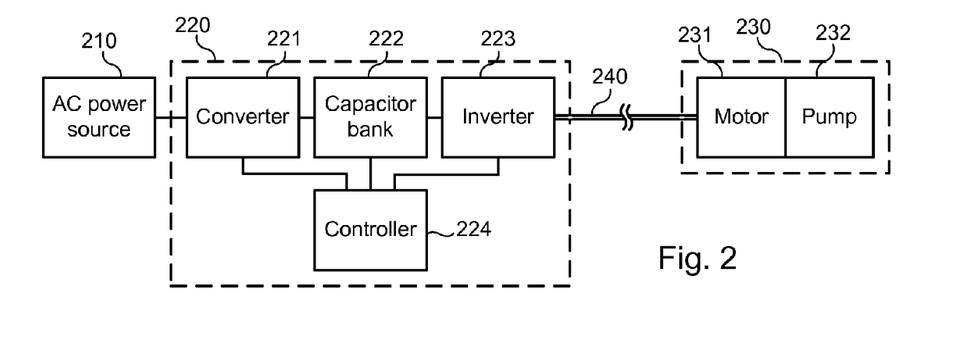
FIG. 2 is a functional block diagram illustrating the structure of a prior art artificial lift system that could be installed in an oil well in accordance with one embodiment.

Referring to FIG. 2, a functional block diagram illustrating the structure of a prior art artificial lift system that could be installed in an oil well is shown. The system includes an AC power source 210, a variable speed drive 220 and a electric submersible pump 230. AC power source 210 may, for example, be a three-phase, 50-60 Hz, 400V-480V power source. The three-phase power from source 210 is provided to the converter 221 of variable speed drive 220. Converter 221 converts the AC power to DC, and the output of the converter charges a capacitor bank 222. Capacitor bank 222 provides DC power to an inverter 223 of the drive. Inverter 223 draws energy from the capacitor bank and produces an output voltage which is used to drive electric submersible pump 230. Converter 221, capacitor bank 222 and inverter 223 are each coupled to a controller 224 that monitors various parameters associated with operation of the drive and provides control signals to these components to control operation of the drive. The output voltage of variable speed drive 220 is transmitted to motor section 231 via cable 240 and is used to power the motor section 231 of the pump. Motor section 231 then drives pump section 232 to pump fluid out of the well.

Figure 3:
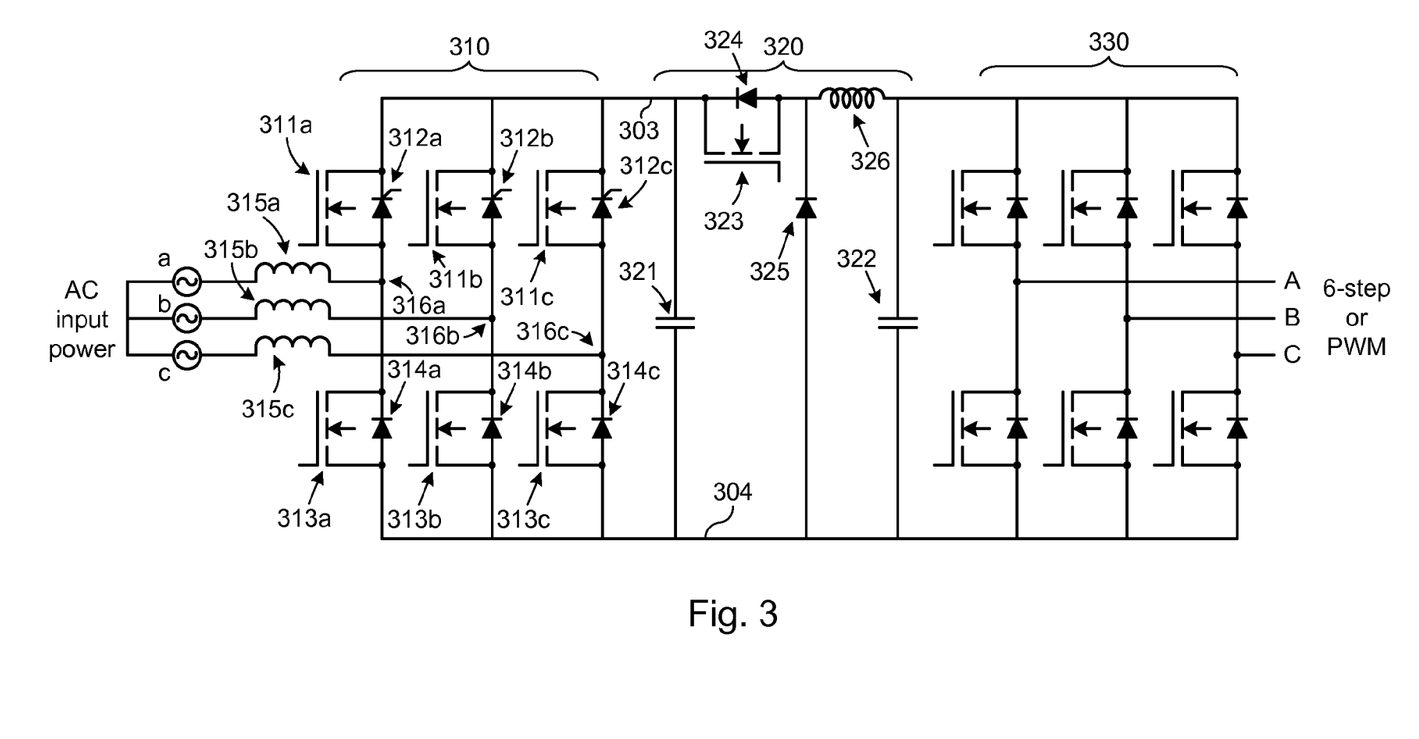
FIG. 3 is a diagram illustrating in greater detail the structure of a variable speed drive in accordance with one embodiment.

Referring to FIG. 3, a diagram illustrating in greater detail the structure of a variable speed drive in accordance with one embodiment is shown. Variable speed drive 300 has a first portion that comprises a converter 310, a capacitor bank portion 320, and a second portion that comprises an inverter 330. Converter 310 has three sections, each of which is identical, except that it is coupled to a unique phase of the three-phase AC input power.

The first converter section consists of a two rectifier components (312a, 314a), two switches (311a, 313a), and an inductor 315a. The two rectifier components are connected together in series between an upper rail (junction) 303 and a lower rail (junction) 304. In this embodiment, rectifier components 312 are controlled rectifiers (e.g., SCRs), while rectifier components 314 are simply diodes. Rectifier components 312a and 314a are connected at an intermediate junction 316a. The first switch (311a) is connected in parallel with rectifier component 312a between intermediate junction 316a and upper rail 303. The second switch (313a) is connected in parallel with rectifier component 314a between intermediate junction 316a and lower rail 304. Inductor 315a is connected between intermediate junction 316a and the first ("a") phase of the power source.

The second and third converter sections are, as noted above, identical to the first converter section, except that they are connected to the "b" and "c" phases of the power source. The components of the second converter section are identified by reference numbers that include a "b" (311b-316b), and the components of the third converter section are identified by reference numbers that include a "c" (311c-316c).

When the variable speed drive is operating normally, capacitor bank 321 is fully charged, or nearly so, and there is no need to limit the amount of current flowing through converter 310. Consequently, the switches (311, 313) are turned off, and controlled rectifiers 312 are allowed to operate as simple diodes. In other words, converter 310 operates as a straightforward diode-bridge rectifier.

In this embodiment, capacitor bank portion 320 includes two capacitor banks—321 and 322. Each of capacitor banks 321 and 322 has one connected to upper rail 303 and the other end connected to lower rail 304. A diode 325 is connected between the upper and lower rails. A switch 323 and an antiparallel diode 324 are connected in parallel between the upper ends of capacitor bank 321 and diode 325. An inductor 326 is connected between the upper ends of diode 325 and capacitor bank 322. This configuration allows the voltage on the second capacitor bank to be controlled, and enables generation of output waveforms while maintaining low input harmonics and a unity power factor. While this configuration provides a number of advantages, it is not essential in other embodiments.

When some event occurs in the operation of the variable speed drive that causes the voltage on capacitor bank 320 to drop below a threshold value, allowing the drive to operate as a simple three-phase rectifier would result in a large inrush of current. This inrush of current could blow a fuse or trip a circuit breaker in the system, causing the system to shut down, or could potentially over-stress and damage the semiconductor components of the drive. Switches 311 and 313 and controlled rectifiers 312 are therefore controlled to limit the amount of current that flows through converter 310 to recharge capacitor bank 320.

Converter 310 operates according to control signals received from a controller. The controller receives signals which indicate the voltage on capacitor bank 320. When the controller determines that the voltage on the capacitor bank is low enough that converter 310 cannot safely be operated as an uncontrolled rectifier system, the controller sends appropriate control signals to switches 311 and 313, controlled rectifiers 312, or both.

Controlled rectifiers 312 may, for example, be silicon controlled rectifiers (SCRs). When a control signal comprising a positive voltage is provided to the gate of an SCR that is off (i.e., not currently conducting) the SCR remains off until the forward voltage across the SCR (e.g., the voltage from intermediate junction 316a to upper rail 303, in the case of controlled rectifier 312a) reaches a threshold. This threshold is determined by the controller based on where in the phase of the input waveform the SCR should be turned on. When this threshold voltage is reached, the SCR is turned on and begins conducting as if it were a diode. The SCR continues to conduct as long as the forward voltage across the SCR is positive. When the forward voltage returns to zero or becomes negative, the SCR turns off and does not conduct. In order for the SCR to conduct again, the forward voltage across the SCR must reach the threshold that is set by the control signal.

The controller determines the timing with which the SCRs (or other controlled rectifiers) of the converter are turned on or "fired." This timing determines when, and for how long the voltage on input line 111 is applied to the bus, and thereby controls the bus voltage. If the SCRs are turned on as soon as the input line voltage goes positive, the SCRs (which will remain on until the input line voltage drops to 0) will be switched on for the maximum amount of time, causing the bus voltage to move toward its maximum. If the switching on of the SCRs is delayed (with respect to when simple diodes would begin to conduct), they will be switched on for less than the maximum amount of time, and the capacitor bank will be charged more slowly.

The variable speed drive's controller may also control the current that flows to the capacitor bank by controlling switches 311 and 313. In a typical rectifier system, when a phase of the input power is positive, current flows from the intermediate junction (e.g., 316) through a diode (or switched-on SCR 312) to the upper rail 303. When the phase is negative, current flows from the lower rail 304 through a diode (e.g., 314) to the corresponding intermediate junction 316. When switches 311 and 313 are off, the current can only flow through the rectifier components. When switches 311 and 313 are on, however, current can flow through them, bypassing the rectifier components.

For instance, when a phase of the input power is positive and switches 311 and 313 are off, current flows through inductor 315, from intermediate junction 316 through diode (or switched-on SCR) 312 to the upper rail 303. The current cannot flow against diode 314 to lower rail 304. If, however, switch 313 is turned on, current continues to flow through inductor 315, through the switch to lower rail 304 instead of flowing through SCR 312 to upper rail 303. Similarly, when the phase is negative and switches 311 and 313 are off, current flows from lower rail 304 to intermediate junction 316 and inductor 315 through diode 314, but no current flows through SCR 312 to upper rail 303. If switch 311 is turned on, however, current can flow from upper rail 303, through switch 311 and inductor 315, instead of flowing from lower rail 304 through diode 314. In both cases, turning the switches on reduces the amount of charging current delivered to capacitor bank 320.

Figure 4:
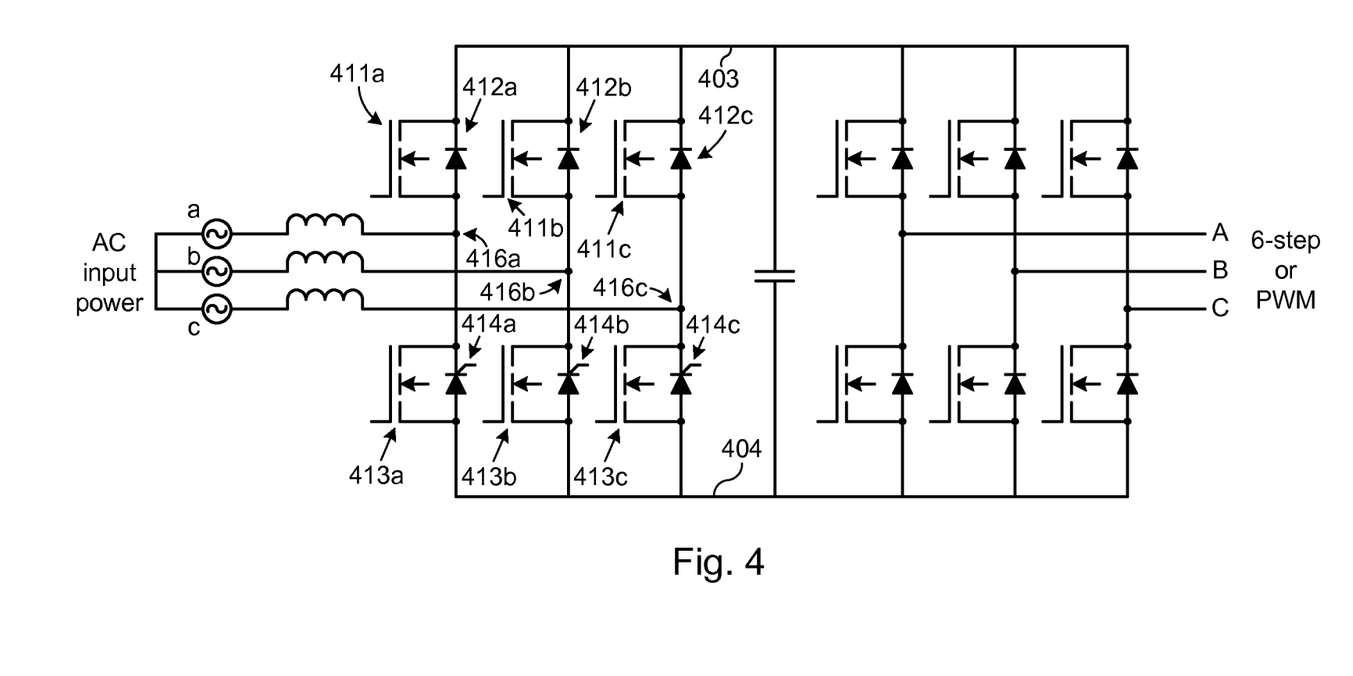
FIG. 4 is a diagram illustrating a variable speed drive in accordance with an alternative embodiment.

Referring to FIG. 4, another exemplary embodiment of a variable speed drive is illustrated. In this embodiment, The drive is again configured to accept three-phase AC power, convert the three-phase AC power to DC power stored in a capacitor bank, and then use the DC power to produce AC output power suitable to drive equipment such as an ESP system.

The embodiment of FIG. 4, like that of FIG. 3, has three identically configured converter sections, each of which is configured to receive one of the three phases of the input AC power, rectify the AC power, and deliver the rectified power to the capacitor bank. The difference between the embodiments of FIGS. 3 and 4 is that in the embodiment of FIG. 4, the upper row of rectifier components (412a-412c) are diodes, while the lower row of rectifier components (414a-414c) are SCRs. Thus, each converter section has one diode in series with one SCR between the upper and lower rails (403 and 404, respectively). The SCRs are operated in a manner that is similar to that described above with respect to FIG. 3, except that when a positive control signal voltage is applied to the gates of the SCRs, the flow of current from the lower rail (404) to the intermediate junction (416a-416c) is limited (instead of the flow of current from the intermediate junction to the upper rail as in the embodiment of FIG. 3). The switches (411a-411c and 413a-413c) are operated in the same manner, and with essentially the same effect, as in the embodiment of FIG. 3.

In an alternative embodiment, the three sections of the converter need not be identical, for example, one of the sections could have the SCR connected to the upper rail, while the other sections could have their SCRs connected to the lower rail. Likewise, one of the sections could have the SCR connected to the lower rail, while the other sections could have their SCRs connected to the upper rail.

Figure 5:
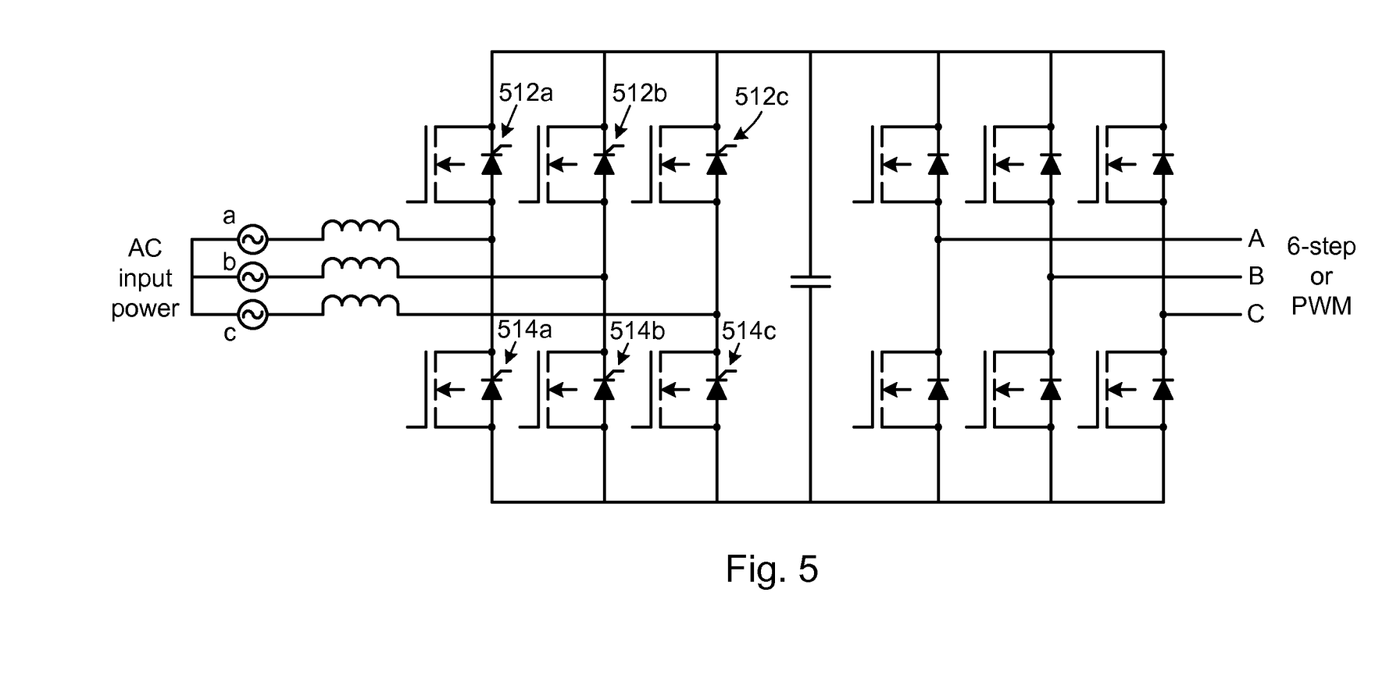
FIG. 5 is a diagram illustrating a variable speed drive in accordance with another alternative embodiment.

Another alternative embodiment is illustrated in FIG. 5. In this embodiment, the converter again has three identically configured converter sections, each of which is configured to receive and rectify one of the three phases of the input AC power and deliver the rectified power to the capacitor bank. Where the embodiments of FIGS. 3 and 4 each have one diode and one SCR (in each converter section) in series between the upper and lower rails, the embodiment of FIG. 5 has two SCRs in series. As a result, the SCRs can be controlled to limit the current during both halves (positive and negative) of the AC waveform. Additionally, the switches that are connected in parallel with the SCRs (511a-511c and 513a-513c) can be operated in the same manner and with essentially the same effect as described above with respect to the embodiment of FIG. 3.

Another alternative embodiment is illustrated in FIG. 5. In this embodiment, the converter again has three identically configured converter sections, each of which is configured to receive and rectify one of the three phases of the input AC power and deliver the rectified power to the capacitor bank. Where the embodiments of FIGS. 3 and 4 each have one diode and one SCR (in each converter section) in series between the upper and lower rails, the embodiment of FIG. 5 has two SCRs in series. As a result, the SCRs can be controlled to limit the current during both halves (positive and negative) of the AC waveform. Additionally, the switches that are connected in parallel with the SCRs (511a-511c and 513a-513c) can be operated in the same manner and with essentially the same effect as described above with respect to the embodiment of FIG. 3.

In each of the embodiments described in connection with FIGS. 3-5, the three sections of the converter are identically configured. In FIG. 3, each section has an SCR connected to the upper rail and a diode connected to the lower rail. In FIG. 4, each section has a diode connected to the upper rail and an SCR connected to the lower rail. In FIG. 5, each section has two SCRs connected between the upper and lower rails. In another alternative embodiment, controlled rectifiers could be used in only two of the three sections of the converter. The third section would have only diodes connected between the upper and lower rails of the converter. Each of the two sections with the controlled rectifiers could have either one or two controlled rectifiers (e.g., SCRs). This would still be sufficient to limit the charging/recharging current that flows to the capacitor.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:
1. A variable speed drive comprising:
   a converter which converts received AC power to DC power;
   one or more capacitor banks coupled to the converter, wherein the DC power produced by the converter charges the one or more capacitor banks; and an inverter connected to the one or more capacitor banks, wherein the inverter inverts DC power from the one or more capacitor banks, thereby producing an AC output waveform;

wherein the converter includes an upper junction which is electrically connected to a first input of the one or more capacitor banks and a lower junction which is electrically connected to a second input of the one or more capacitor banks; and wherein the converter includes first, second and third converter sections, wherein each of the first, second and third converter sections includes first and second rectifier components that are electrically connected in series between the upper junction and the lower junction, wherein at least one of the first and second rectifier components is a controlled rectifier, first and second switches, wherein the first switch is electrically connected in parallel with the first rectifier component, and wherein the second switch is electrically connected in parallel with the second rectifier component, and an inductor having a first end electrically connected to an intermediate junction between the first and second rectifier components and a second end electrically connected to a corresponding one of three phases of a three-phase power source.

2. The variable speed drive of claim 1, further comprising a controller coupled to the controlled rectifiers and the switches, wherein the controller provides control signals to the controlled rectifiers and the switches and thereby selectively limits a recharge current provided by the converter to the capacitor banks.

3. The variable speed drive of claim 2, wherein the controller monitors a voltage on at least one of the capacitor banks, and wherein the controller controls one or more of the controlled rectifiers and the switches to limit the recharge current in response to determining that the voltage on the at least one of the capacitor banks is less than a threshold voltage.

4. The variable speed drive of claim 3, wherein the controller determines when the variable speed drive is powered on and controls one or more of the controlled rectifiers and the switches to limit the recharge current in response to determining that the variable speed drive is being powered on.

5. The variable speed drive of claim 1, wherein the switches comprise insulated gate bipolar transistors.

6. The variable speed drive of claim 1, wherein each of the first rectifier components comprises the controlled rectifier.

7. The variable speed drive of claim 1, wherein each of the second rectifier components comprises the controlled rectifier.

8. The variable speed drive of claim 1, wherein both the first and second rectifier components comprise controlled rectifiers.

9. An artificial lift system comprising:
an electric submersible pump system; and
a variable speed drive coupled to provide power to the electric submersible pump system, wherein the variable speed drive includes a converter which converts received AC power to DC power, one or more capacitor banks coupled to the converter, wherein the DC power produced by the converter charges the one or more capacitor banks, and an inverter coupled to the second capacitor bank, wherein the inverter inverts DC power from the one or more capacitor banks, thereby producing an AC output waveform;

wherein the converter includes an upper junction which is electrically coupled to a first input of the one or more capacitor banks and a lower junction which is electrically coupled to a second input of the one or more capacitor banks; and wherein the converter includes first, second and third converter sections, wherein each of the first, second and third converter sections includes first and second rectifier components that are electrically coupled in series between the upper junction and the lower junction, wherein at least one of the first and second rectifier components is a controlled rectifier, first and second switches, wherein the first switch is electrically coupled in parallel with the first rectifier component, and wherein the second switch is electrically coupled in parallel with the second rectifier component, and an inductor having a first end electrically coupled to an intermediate junction between the first and second rectifier components and a second end electrically coupled to a corresponding one of three phases of a three-phase power source.

10. The artificial lift system of claim 9, further comprising a controller coupled to the controlled rectifiers and the switches, wherein the controller provides control signals to the controlled rectifiers and the switches and thereby selectively limits a recharge current provided by the converter to the capacitor banks.

11. The artificial lift system of claim 10, wherein the controller monitors a voltage on at least one of the capacitor banks, and wherein the controller controls one or more of the controlled rectifiers and the switches to limit the recharge current in response to determining that the voltage on the at least one of the capacitor banks is less than a threshold voltage.

12. The artificial lift system of claim 11, wherein the controller determines when the variable speed drive is powered on and controls one or more of the controlled rectifiers and the switches to limit the recharge current in response to determining that the variable speed drive is being powered on.

13. The artificial lift system of claim 9, wherein the switches comprise insulated gate bipolar transistors.

14. The artificial lift system of claim 9, wherein each of the first rectifier components comprises the controlled rectifier.

15. The artificial lift system of claim 9, wherein each of the second rectifier components comprises the controlled rectifier.

16. The artificial lift system of claim 9, wherein both the first and second rectifier components comprise controlled rectifiers.

17. A method for producing an output waveform suitable for driving equipment such as an electric submersible pump motor, the method comprising:
providing a variable speed drive having
a converter which converts received AC power to DC power,
one or more capacitor banks coupled to the converter, wherein the DC power produced by the converter charges the one or more capacitor banks, and
an inverter coupled to the second capacitor bank, wherein the inverter inverts DC power from the one or more capacitor banks, thereby producing an AC output waveform,
wherein the converter includes one or more converter sections, each of which has first and second rectifier components that are electrically connected in series between terminals of the one or more capacitor banks, and an inductor connected between an intermediate junction between the first and second rectifier components and an input for one of three phases of a three-phase power source, wherein at least one of the first and second rectifier components is a controlled rectifier, and wherein each of the rectifier components has a switch connected in parallel with the rectifier component;

determining when a voltage on at least one of the capacitor banks is less than a threshold voltage; and when the voltage on the at least one of the capacitor banks is less than the threshold voltage, providing control signals to the controlled rectifiers and the switches and thereby selectively limiting a recharge current provided by the converter to the capacitor banks.

\* \* \* \* \*